US011835964B2

(12) United States Patent
Jornod et al.

(10) Patent No.: US 11,835,964 B2
(45) Date of Patent: Dec. 5, 2023

(54) METHOD FOR DETERMINING A HIGH-DENSITY PLATOONING DRIVING MANEUVER, APPARATUS, VEHICLE AND COMPUTER PROGRAM

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 343 days.

(21) Appl. No.: 16/900,282

(22) Filed: Jun. 12, 2020

(65) Prior Publication Data

US 2020/0393850 A1 Dec. 17, 2020

(30) Foreign Application Priority Data

Jun. 12, 2019 (EP) ..................... 19179745

(51) Int. Cl.
*G05D 1/02* (2020.01)
*H04W 4/46* (2018.01)
*B60W 30/165* (2020.01)

(52) U.S. Cl.
CPC ......... *G05D 1/0293* (2013.01); *B60W 30/165* (2013.01); *G05D 1/0289* (2013.01); *G05D 1/0295* (2013.01); *H04W 4/46* (2018.02)

(58) Field of Classification Search
CPC .. G05D 1/0293; G05D 1/0289; G05D 1/0295; G05D 1/0291; G05D 2201/0213;
(Continued)

(56) References Cited

U.S. PATENT DOCUMENTS 9,549,291 B2 1/2017 Tseng et al.
10,979,995 B2 4/2021 Slanina
(Continued)

FOREIGN PATENT DOCUMENTS

CN 109196888 A 1/2019
CN 109863778 A 6/2019
(Continued)

OTHER PUBLICATIONS

Machine translation of KR20170047043A retrieved from Espacenet on Jun. 8, 2022 (Year: 2022).*
(Continued)

*Primary Examiner* — Thomas Ingram
*Assistant Examiner* — Faris Asim Shaikh
(74) *Attorney, Agent, or Firm* — BARNES & THORNBURG, LLP

(57) ABSTRACT

A method for determining a high-density platooning (HDPL) driving maneuver which includes selecting an HDPL closing maneuver, and selecting an HDPL opening maneuver. Closing maneuver means a maneuver with which the inter-vehicle distance between platoon members is decreased. Opening maneuver means a maneuver with which the inter-vehicle distance between platoon members is increased. The method also includes testing the selected HDPL maneuvers in terms of energy consumption taking into account a predicted quality of service (QoS) of a vehicle-to-vehicle V2V communication link for the communication between the platoon members. In response to the selected HDPL driving maneuvers not fulfilling the test criteria, the method waits a time and then selects an HDPL closing maneuver and an HDPL opening maneuver and tests the newly chosen HDPL maneuver again.

18 Claims, 6 Drawing Sheets

(58) Field of Classification Search
CPC .. B60W 30/165; B60W 2556/65; H04W 4/46; H04W 4/02; H04W 24/06; H04W 24/08; H04W 52/0258; H04W 24/02; H04W 92/18; Y02D 30/70; H04L 41/147; H04L 41/5009; H04L 43/50; H04L 43/55; H04L 67/12; H04L 67/30; G08G 1/22; G08G 1/096725; G08G 1/161
See application file for complete search history.

(56) References Cited

U.S. PATENT DOCUMENTS

| | | | |
|---|---|---|---|
| 2010/0256835 A1* | 10/2010 | Mudalige | G08G 1/164 701/2 |
| 2010/0256852 A1* | 10/2010 | Mudalige | G08G 1/164 701/24 |
| 2015/0005974 A1 | 1/2015 | Milenkovic et al. | |
| 2017/0018190 A1* | 1/2017 | Yamasaki | G05D 1/0297 |
| 2018/0082385 A1 | 3/2018 | Frolik et al. | |
| 2018/0130354 A1* | 5/2018 | Bender | G08G 1/096775 |
| 2019/0246303 A1 | 8/2019 | Alieiev et al. | |
| 2021/0243754 A1 | 8/2021 | Zhao | |

FOREIGN PATENT DOCUMENTS

| | | | | |
|---|---|---|---|---|
| DE | 102010013647 A1 | 2/2011 | | |
| DE | 102010029748 A1 | 2/2011 | | |
| DE | 102015104634 A1 | 10/2015 | | |
| DE | 102016205143 A1 | 10/2017 | | |
| EP | 3376682 A1 | 9/2018 | | |
| EP | 3461166 A1 * | 3/2019 | ............. | H04W 4/46 |
| JP | 2015022422 A * | 2/2015 | ............. | B60R 21/00 |
| KR | 20170047043 A * | 5/2017 | ............. | B60W 30/16 |
| KR | 20170047043 A | 5/2017 | | |

OTHER PUBLICATIONS

Machine translation of EP3461166A1 retrieved from Espacenet on Jun. 8, 2022 (Year: 2022).*
Machine translation of Jp2015022422 retrieved from JPlatPat on Jun. 8, 2022 (Year: 2022).*
Office Action for Chinese Patent Application No. 202010534300.3; dated Apr. 2, 2022.
Office Action for Korean Patent Application No. 10-2020-0071043; dated Jul. 9, 2021.
Jornod et al.; Packet Inter-Reception Time Modeling for High-Density Platooning in Varying Surrounding Traffic Density; May 7, 2019; downloaded from https://publikationsserver.tu-braunschweig.de/servlets/MCRFileNodeServlet/dbbs_derivate_00045321/PIR_Jornod.pdf.
Search Report for European Patent Application No. 19179745.5; dated Nov. 26, 2019.
Office Action; European Patent Application No. 19179745.5; dated Mar. 17, 2022.

* cited by examiner

METHOD FOR DETERMINING A HIGH-DENSITY PLATOONING DRIVING MANEUVER, APPARATUS, VEHICLE AND COMPUTER PROGRAM

PRIORITY CLAIM

This patent application claims priority to European Patent Application No. 19179745.5, filed 12 Jun. 2019, the disclosure of which is incorporated herein by reference in its entirety.

SUMMARY

Illustrative embodiments relate to a method for determining a high-density platooning HDPL driving maneuver. Illustrative embodiments also relate a corresponding apparatus for performing the method, a transportation vehicle and a corresponding computer program.

BRIEF DESCRIPTION OF THE DRAWINGS

Exemplary embodiments are shown in the drawings and are explained in greater detail in the following description. In the drawings.

DETAILED DESCRIPTION

Figure 1:
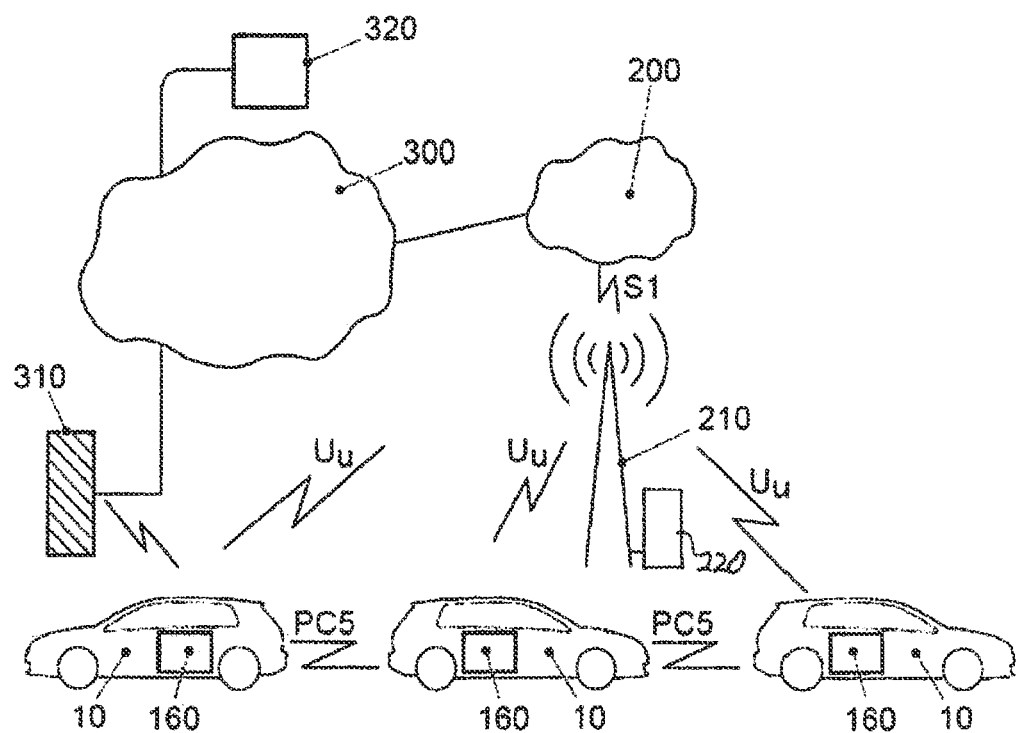
FIG. 1 illustrates the principle architecture of a V2V and V2X communication system.

For the scenario of transportation vehicles equipped with wireless communication modules that provide connectivity to public communication networks but also provide a direct communication capability for exchanging information among the road participants, wireless communication offers the opportunity to implement a wide range of applications. A lot of research concerns the fields of cooperative and autonomous driving. Direct communication between transportation vehicles is often referred to be vehicle-to-vehicle communication V2V.

Typical communication scenarios for V2V communication are road safety scenarios, traffic efficiency scenarios and infotainment scenarios. From the road safety scenarios the following examples are mentioned: "Cooperative Forward Collision Warning", "Pre-Crash-Detection/Warning", "Lane change warning/blind spot warning", "Emergency Electric Brake Light Warning", "Intersection Movement Assist", "Emergency Vehicle Approaching", "Road Works Warning" (non-exhaustive list). From the traffic efficiency scenarios the "High-Density Platooning" (HDPL) is mentioned. Since the high density platooning application is a form of cooperative driving with a plurality of transportation vehicles in a convoy with small distance (<10 m) it is very critical in terms of the safety requirements.

Particularly in the field of high density platooning, the transportation vehicles in the convoy need to exchange a plurality of messages. Typically, the entire convoy is controlled by a transportation vehicle configured as a lead transportation vehicle, it is called platoon leader. For example, a feedback of information about an intended braking maneuver is planned from the front to the rear to avoid rear-end collisions. Some platooning systems use a decentralized controller that is also supported by the exchange of messages. In these systems, some centralized decision functions can be run on a specific platoon member, too.

Currently the following mobile communication technologies are applicable for bringing connectivity to a transportation vehicle: 3GPP-based UMTS, HSPA, LTE, and the upcoming 5G standards.

For the V2V or V2X communication the following technologies are readily available. LTE-V sidelink communication, also called PC5 interface, 5G PC5 communication, WLAN p communication (IEEE 802.11p).

Autonomous driving is on the rise. Though it has been demonstrated that autonomous transportation vehicles can rely on their own sensors for environmental scanning, it is foreseen that they can greatly benefit from cooperation with surrounding transportation vehicles, either in terms of control or in terms of perception. This cooperation is supported by V2V or in general V2X communication.

Communication standards define performance metrics for communication technologies such as minimums, maximums, averages, etc. of some key performance indicators KPIs. The indicators, such as latency ti of a data communication, throughput Th, data rate DR, packet error rate PER, vary within and around these values, sometimes drastically dropping or increasing. This variation can drastically affect the quality of applications. For safety-related applications, such as some applications of cooperative automated driving, the average achievable latency with best effort policy does not comply with the quality requirements of the automotive industry, for instance. Especially when it comes to V2V and V2X and time critical safety related applications, this potential variation and this absence of guaranty of quality of service seriously QoS affects the potential use of such technologies.

A novel concept of adaptation of the application to the quality of service, the so-called Agile Quality of Service Adaptation (AQoSA) is emerging within the automotive industry. However, considering the tight time constraints that are generally characterizing automotive safety-related applications, reacting to the QoS is not sufficient, considering the involved adaptation delays, for instance. This is where the concept of QoS prediction intervenes.

The present proposal relates to the field of performing HDPL driving maneuvers. A platoon leader will coordinate the HDPL driving maneuver. A problem with the HDPL driving maneuvers is that they will be performed on a high way with surrounding traffic, heterogeneous cellular network access, variating scattering and shadowing object presence. These conditions let the QoS of the different V2V communication link drastically vary. Since the HDPL relies on communications between the platoon members to drive with very short inter-vehicle distances, a drop in the communication performance, in particular, in an end-to-end latency, would affect its safe running. Therefore, it is needed to adapt the inter-vehicle distance based the prediction of the link-based QoS.

A method of controlling multiple transportation vehicles to operate the plurality of transportation vehicles in a convoy is known from DE 10 2010 013 647 A1, which includes that a leader is selected from the plurality of transportation vehicles: The method further includes monitoring a respective actual position of each of the plurality of transportation vehicles that is not the leader, determining distances to operate the plurality of transportation vehicles in the convoy based on the respective actual positions of each of the plurality of transportation vehicles.

From DE 10 2016 205 143 A1 it is known a method and apparatus, and a computer program for adjusting the direct vehicle-to-vehicle communication. The method includes determining information about a position of the transportation vehicle. The method further includes obtaining information about location-dependent transmission parameters for direct vehicle-to-vehicle communication of the transportation vehicle. The method further comprises determining transmission parameters for the position of the transportation vehicle based on the information about the position of the transportation vehicle and based on the information about the location-dependent transmission parameters. The method further comprises adjusting the vehicle-to-vehicle direct communication of the transportation vehicle based on the transmission parameters for the position of the transportation vehicle.

From US 2017/018190 A1 a wireless system for a mine is known which performs a management of the quality of wireless communication at each point in the mine at a time point closer to a current time while maintaining the operating state of each dump truck. The wireless system is provided with a server, wireless base stations and dump trucks in the mine. The server contains fleet operations management information and communication quality information, and the dump trucks each include a GPS and a wireless terminal. The server specifies an update target point where the communication quality information requires an update. Then, the server specifies one of the dump trucks, to travel through the update target point, from the fleet operations management information, calculates a time at which the dump truck would arrive at the update target point, and performs communication trigger processing to make the dump truck transmit wireless data.

From US 2019/246303 A1 it is known a method for monitoring the quality of a data connection, subscriber station, and network management unit for use in the method. This method for monitoring of quality of service includes monitoring the quality measured at the radio modem based on measurements in the physical layer and monitoring of the network state by the physical layer or a higher layer wherein the monitoring entity bypasses one or more intermediate layers and directly accesses the physical layer, which provides the necessary information. Platooning is one application mentioned in which the method for monitoring the quality of a data connection, could be used.

From the article, Guillaume Jornod et al.: "Packet Inter-Reception Time for High-Density Platooning in Varying Surrounding Traffic Density", published on publikationsserver.tu-braunschweig.de on 7 May 2019, it is known a quality of service prediction model formulation for the use in a high-density platooning system.

Again, what is needed is to adapt the inter-vehicle distance to optimize energy consumption where it needs to take into account the prediction of the link-based QoS.

Disclosed embodiments provide a method for determining a high-density platooning HDPL driving maneuver, a corresponding apparatus for performing the method, a transportation vehicle and a corresponding computer program.

Getting a predicted QoS profile from the cellular network, or from any communication systems prediction instance, the platooning system must choose a strategy to perform HDPL (low headway distances) but also needs to take into account that the quicker it achieves the purpose of HDPL, that is to reduce the fuel consumption, the more it has to potentially consume fuel to achieve this fast maneuver. Linked to this strategy choice, the HDPL system has to evaluate how long it needs to keep the HDPL maneuver to make it performant. This evaluation is however challenged by the uncertainty of the predicted value, which can change the maneuvering plan.

In general, the proposed solution relates to a method for determining a high-density platooning driving maneuver comprising selecting a HDPL closing maneuver, selecting a HDPL opening maneuver and testing the selected high-density platooning closing and opening maneuvers with at least one test criterion. Such test criterion is comprising a test in terms of energy consumption, under consideration of a predicted quality of service profile of a vehicle-to-vehicle communication link for the communication between the platoon members. If the selected high-density platooning closing and opening maneuvers do not fulfill the test criterion, the application will wait a time period and then perform selecting a high-density platooning closing maneuver and selecting a high-density platooning opening maneuver anew, and testing the newly selected high-density platooning closing and opening maneuver with the test criterion.

This solution has the benefit that not only the energy consumption is the decisive selection criterion for HDPL driving maneuvers but also the predicted QoS. If the predicted QoS is not good enough for performing the selected HDPL closing maneuver, there is a high likelihood that a HDPL opening maneuver needs to be performed for safety reason, thereby eliminating the positive effect of energy consumption reduction since the compensation time for the additional energy consumption due to the closing maneuver is not long enough to reach a positive energy budget.

In at least one disclosed embodiment, at least a predicted quality of service profile for a packet inter-reception time of the V2V communication link is considered in the test criterion. In tests it has been found that the packet inter-reception time PIR is a very important QoS parameter for HDPL.

Here it is beneficial, that at least one maximum value $\gamma_{max}$ of the packet inter-reception time is selected for defining a limit of an acceptable QoS level in the test criterion. In this disclosed embodiment simply a fixed value for a packet inter-reception time is selected. This may be determined in an simulation and testing phase during development of the HDPL application.

In another disclosed embodiment, a time value T2, where the predicted QoS profile crosses the selected maximum value $\gamma_{max}$ is used to test the selected HDPL closing and opening maneuvers. The T2 time value therefore corresponds to the time period for which an acceptable QoS is predicted.

In a further disclosed embodiment the time value T2 is decreased by a time value ΔT2 corresponding to the uncertainty for the QoS prediction at the time value T2. This has the benefit, that the reliability of the test is further increased.

In a still further disclosed embodiment, the testing of the chosen HDPL driving maneuvers is made based on the following principle which here is expressed in a formula:

$$T_{M1}+T_{C1}+T_Q+T_{M2}+T_{C2}+T_{C2} \leq T_2-\Delta T_2,$$

where $T_{M1}$ corresponds to a closing maneuver time of the selected HDPL closing maneuver, where $T_{C1}$ corresponds to the energy consumption compensation time for the selected HDPL closing maneuver, where $T_Q$ corresponds to a system deployment cost compensation time to compensate the costs of the QoS and of the deployment investment, where $T_{M2}$ corresponds to the maneuver time value of the selected HDPL opening maneuver, where $T_{C1}$ corresponds to the energy consumption compensation time for the selected HDPL opening maneuver. This formula includes the system deployment compensation time $T_Q$ which further adapts the testing criterion to the actual predicted QoS parameter thereby increasing the accuracy of the test.

It is further beneficial, that the HDPL closing maneuver time TM1 is selected by taking the time value T1 selected from the predicted QoS profile under the criterion that the maximum useable value γmax of the packet inter-reception time is reached at the time value T1, where the sum of the HDPL closing maneuver time value TM1 and its energy consumption compensation time value TC1 should be minimized with the condition that the closing maneuver time value TM1 is greater or equal to the time value T1 This has the benefit of reducing the energy consumption compensation time value TC1 while increasing the benefit of HDPL driving maneuver.

Likewise, it is beneficial to apply a Pareto efficient solution for selecting the HDPL opening maneuver, in which the minimization of an HDPL opening maneuver time value TM2 is favored compared to the minimization of the corresponding energy consumption compensation time value TC2. In other words a Pareto efficient solution for choosing the HDPL opening maneuver is used, in which a short opening maneuver is favored compared to the energy consumption criterion within a certain range. The shortest HDPL opening maneuver cannot be selected as it would mean that the condition to perform HDPL would thus often not be met. Indeed, if the shortest opening maneuver time TM2 is used, such a high corresponding energy consumption compensation time TC2 would be required that it is not worth doing the maneuver. Instead, it is beneficial to weight the two objectives differently, with a higher weight for the short maneuvers, and a smaller weight for the energy efficiency, to have a fast maneuver that does not consume too much energy.

For an apparatus it is beneficial if the apparatus comprises a processing device which is adapted to perform the method according to one of the previous claims. Typically, this processing device is a microcontroller, microprocessor or microcomputer.

Such kind of apparatus can be installed in a transportation vehicle. It is beneficial that each transportation vehicle which shall participate in HDPL is equipped with such kind of apparatus even though this apparatus needs to be active on the platoon leader only. The role of the platoon leader however may change from time to time such that in principle each transportation vehicle should be ready to take over the role of the platoon leader.

For a corresponding computer program, it is beneficial that it comprises program code, which when run in a processing device performs the method according to the proposal.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a way for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited ways are combined and brought together the way the claims call for. It is thus regarded that any method or mechanism that can provide those functionalities are equivalent to those shown herein.

FIG. 1 shows the system architecture for the proposal. Reference number 10 denotes a user device. The depicted user device is exemplified as a transportation vehicle and, more in particular, it is a car. In other examples it may be differently exemplified, e.g., a smart phone, a smart watch, a tablet computer, notebook or laptop computer or the like.

Shown is a passenger car. If exemplified with a transportation vehicle, it may be any type of a transportation vehicle. Examples of other types of vehicles are: buses, motorcycles, commercial vehicles, in particular, trucks, agricultural machinery, construction machinery, etc. The use of the disclosed embodiments would be generally in land vehicles, and aircrafts possible. The transportation vehicle 10 is equipped with an on-board communication module 160 including corresponding antenna such that the transportation vehicle 10 can participate in any form of a mobile communication service. FIG. 1 illustrates that transportation vehicle 10 may transmit and receive signals to and from a base station 210 of a mobile communication service provider via the so-called Uu-link. This is for upload and download communication direction between transportation vehicle 10 and base station 210.

Such base station 210 may be an eNodeB base station of an LTE (Long Term Evolution) mobile communication service provider or a gNodeB of a 5G mobile communication service provider. The base station 210 and the corresponding equipment is part of a mobile communication network with a plurality of network cells where each cell is served by one base station 210.

The base station 210 in FIG. 1 is positioned close to a main road on which the transportation vehicle 10 is driving. Of course, other transportation vehicles may also drive on the road. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The cars 10 are equipped with the on-board communication module OBU 160. This OBU corresponds to an LTE communication module with which the transportation vehicle 10 can receive mobile data in downstream direction and can send such data in upstream direction. This OBU 160 may further be equipped with multi-RAT technology corresponding to radio access technology. Multi-RAT networks combine several radio access technologies to deliver the service to users (e.g., UMTS, LTE, 5G, Wi-Fi). For the application in transportation vehicles and for the implementation of V2V and V2X communication capability primarily the following technologies will be combined: LTE-V corresponds to the 4G mobile communication technology, PC5 corresponds to the 5G mobile communication technology and WLAN p, corresponds to the IEEE 802.11p communication technology.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

From this general architecture FIG. 1 shows that eNodeB 210 is connected to the EPC 200 via the S1 interface and that EPC 200 is connected to the Internet 300. The backend server 320 to which the transportation vehicles 10 send messages to and receive messages from is also connected to the Internet 300. In the field of cooperative and autonomous driving the backend server 320 typically is located in a traffic control center. The S1 interface may be reduced to practice with wireless communication technology such as with the help of microwave radio communication by directional antennas or wired communication technology based on fiber cables. Finally, an infrastructure network component is also shown. This may be exemplified by a road-side unit RSU 310. For the ease of implementation, it is considered that all components have assigned an Internet address, typically an IPv6 address, such that the packets transporting messages between the components can be routed correspondingly.

The various interfaces of the LTE network architecture are standardized. It is referred to the various LTE specifications, which are publicly available for the sake of sufficiently disclosing further implementation details.

Figure 2:
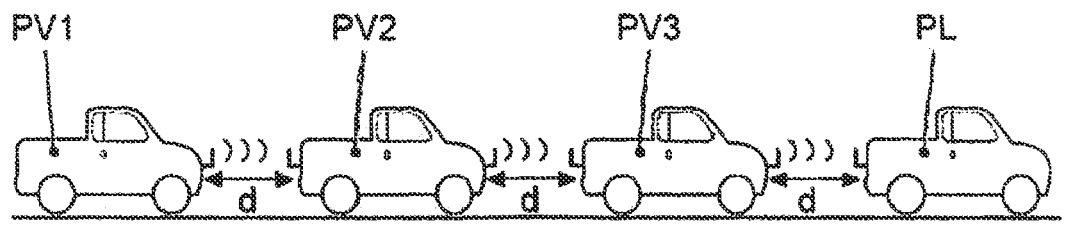
FIG. 2 shows a high-density platooning scenario in which a plurality of transportation vehicles cooperatively drives in a convoy.

As already mentioned in the consistory clause, one prominent example of a cooperative driving maneuver is called "platooning". FIG. 2 shows what it is. Platooning refers to the intelligent convoy driving as an application. A very demanding convoy driving is "high density platooning". Thereby, the inter-vehicle distances are adapted to the traffic situation and controlled. The aim is to reduce the distance d between the convoy transportation vehicles as much as possible to reduce energy consumption. For this purpose, messages must be constantly exchanged between the convoy transportation vehicles. There is one transportation vehicle which is coordinating the cooperative driving maneuver. It is the transportation vehicle at the front of the platoon, which is called the platoon leader. In FIG. 2 the platoon leader is marked with reference sign PL. The other transportation vehicles in the platoon are marked with reference signs PV1, PV2, PV3, PV4.

Typically, in high density platooning, trucks of appropriate length, band together to cover a distance together to save energy and protect the environment. All transportation vehicles are equipped with a GNSS receiver corresponding to Global Navigation Satellite System. Examples of a GNSS receiver are a GPS-receiver corresponding to Global Positioning System, Galilei-, GLONASS- and Beidou-receiver. All transportation vehicles of the platoon are equipped with the on-board communication unit 160 including direct vehicle-to-vehicle communication capability. For measuring the inter-vehicle distance, it is mentioned that the transportation vehicles PV1 to PL may also be equipped with UWB transceivers corresponding to ultra-wide-band transceivers. The transportation vehicles may each be equipped with 2 UWB transceivers, one at the front of the transportation vehicle and a second at the rear of the transportation vehicle. The UWB transceivers allow the measurement if the inter-vehicle distance with great accuracy. The transportation vehicles are also equipped with a platoon coordination module. However, this feature is only activated on the platoon leader transportation vehicle PL.

Figure 3:
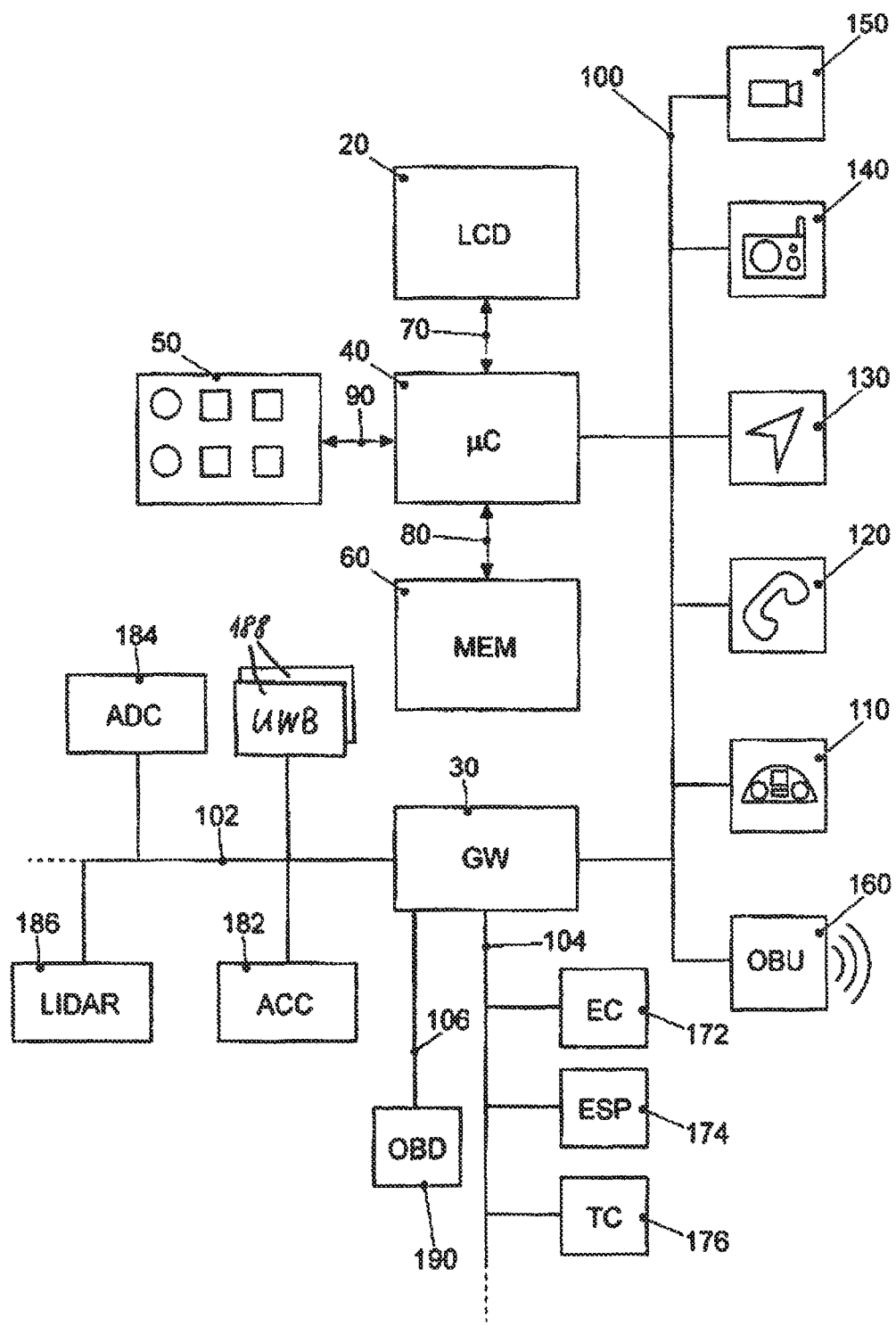
FIG. 3 shows a block diagram of the electronics system of a transportation vehicle.

FIG. 3 shows schematically a block diagram of the transportation vehicle's 10 board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area) for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 is the high-speed option of the CAN bus according to ISO standard 11898-2 into consideration. Alternatively, for example, the use of an Ethernet-based bus system such as IEEE 802.03cg is another example. Bus systems in which the data transmission via optical fibers happens are also usable. Examples are the MOST Bus (Media Oriented System Transport) or the D2B Bus (Domestic Digital Bus). For inbound and outbound wireless communication, the transportation vehicle 10 is equipped with a communication module 160. This communication module 160 is often referred to as an on-board communication module OBU as mentioned above. It can be used for mobile communication, e.g., mobile communication according to the LTE standard, according to Long Term Evolution or the 5G standard. The on-board communication module 160 may also be equipped with an IEEE 802.11p interface for V2V communication. It may also be equipped with multi-RAT technology as mentioned above.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the transportation vehicle and these are no longer only connected to individual control units, such sensor data are also distributed via the bus system 104 to the individual control devices.

However, the modern transportation vehicle can also have further components such as further surroundings scanning sensors like a LIDAR (Light Detection and Ranging) sensor 186 or RADAR (Radio Detection and Ranging) sensor, ultrasonic sensors and more video cameras, e.g., as a front camera, rear camera or side camera. Such sensors are used more and more in transportation vehicles for surroundings observation. Further control devices, such as an automatic driving control unit ADC 184 and an adaptive cruise control unit ACC 182, etc., may be provided in the transportation vehicle. There may be other systems in the transportation vehicle, too such as the UWB transceivers 188 for inter-vehicle distance measurement. The UWB transceivers 188 may typically be used for a short distance observation, e.g., 3 to 30 m. The RADAR and LIDAR sensors could be used for scanning a range up to 250 m or 150 m and the cameras cover a range from 30 to 120 m. The components 182 to 188 are connected to another communication bus 102. The Ethernet-Bus is a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. Particularly for those road participants not being in line of sight LOS to the observing transportation vehicle it is very beneficial to receive the information about their position and motion via V2V communication.

Reference number 190 denotes an on-board diagnosis interface.

For the purpose of transmitting the vehicle-relevant sensor data via the communication interface 160 to another transportation vehicle or to a central computer 320, the gateway 30 is provided. This is connected to the different bus systems 100, 102, 104 and 106. The gateway 30 is adapted to convert the data it receives via the one bus to the transmission format of the other bus so that it can be distributed in the packets specified there. For the forwarding of this data to the outside, i.e., to another transportation vehicle or to the central computer 320, the on-board unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

Figure 4:
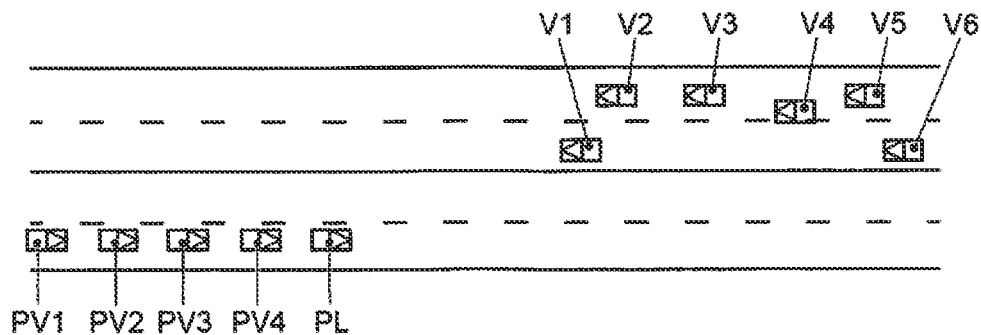
FIG. 4 shows a first stage scenario of a platoon moving on a motorway.

FIG. 4 shows a typical traffic scenario where a platoon is driving on a motorway. The platoon consists in this example of five transportation vehicles PV1 to PV4 and PL. The platoon is moving from left to right. A plurality of other transportation vehicles V1 to V6 is coming along on the opposite side of the motorway moving from right to left.

Figure 5:
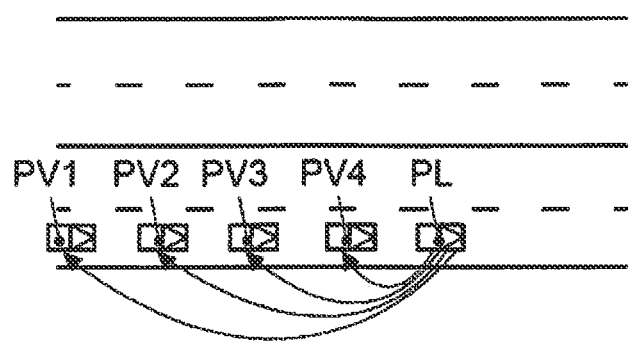
FIG. 5 shows the first stage scenario of the platoon moving on a motorway where the platoon leader is communicating with the platoon members.

FIG. 5 shows how the platoon leader PL is controlling the platoon members PV1 to PV4 following him. A default link is to be used for this control communication, e.g., the LTE-V side-link communication channel. A control command is commanding the platoon members PV1 to PV4 to increase or decrease the inter-vehicle distance in the platoon.

Under the considered scenario of cooperative or autonomous driving the transportation vehicles broadcast so-called Cooperative Awareness Messages (CAM), Decentralized Environmental Notification Message (DENM) and Collective Perception Messages (CPM), etc. periodically such that they are aware which other transportation vehicles are in the vicinity. Cooperative awareness messages contain important status information from a sending transportation vehicle, such as position, speed, heading, accelerating data, etc. Since CAM messages are standardized, more detailed information is provided in the ETSI standard ETSI EN 302 637—2 V1.3.2 (2014-11). CAM information provides information about the traffic flow. They are compressed and transmitted to the traffic control center 320. CAM messages contain the transportation vehicle data, the date and time, position and speed.

In the CPM messages V2X transportation vehicles equipped with local perception sensors broadcast their locally perceived objects in the surroundings derived from the analysis of the sensor data. Since the environment sensors deliver picture setting information the typical analysis algorithms correspond to image processing algorithms such as object recognition algorithms. Such message types CAM, DENM and CPM will be gathered at the communication service prediction server 220 of the base station 210 to which these reporting transportation vehicles are signed in. By aggregating these data sets, plus the information about frequency, bandwidth, link budget, cell load, throughput, latency, etc. the communication service prediction server 220 at the base station 210 has a good basis for deriving a model for predicting the QoS. The way how to derive a model for predicting the QoS is not part of the proposal here. There exists another patent application, internally referenced K 27182 of the applicant where further details to data modelling and QoS prediction are found.

The previous results allow to choose a maneuvering strategy depending on the prediction horizon of the QoS. The periodic exchange of situational information in CAM, DENM and CPM messages but also the submission of platooning control messages (PCM) by the platoon leader PL is at the basis of most active safety applications in vehicular environments, and understanding its performance in real-world situations is very important. In the following, we consider the packet inter-reception time (PIR) as the predicted QoS parameter. The packet inter-reception time is defined as the time elapsing between the reception of two successive packets from the same source at a specific transportation vehicle; and is an important parameter for V2N and V2V communication.

This PIR parameter is even more relevant for the platooning application than the packet error rate (PER) in terms of QoS. For the platooning application it is important to know what is the time between the reception of two messages, e.g., two PCM messages, from the same source, e.g., the platoon leader PL, and the answer to this corresponds to the packet inter-reception time (PIR). In other words, the PIR parameter is the answer to the question how long the transportation vehicle 10 has to rely solely on its sensors and outdated information.

Figure 6:
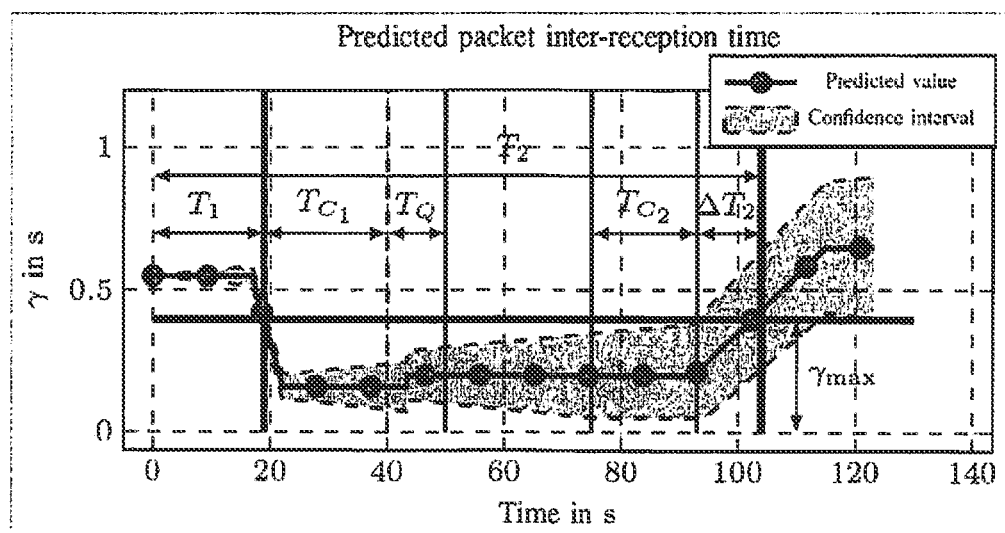
FIG. 6 shows a predicted QoS profile for the V2V communication between the platoon leader and the platoon members.

The platoon leader PL receives the predictive quality of service (PQoS) profile, from the communication service prediction server 220 with a confidence that is decreasing in time. An exemplary PIR profile is provided in FIG. 6. In FIG. 6 the PIR value is represented with the Greek letter γ. The dashed area around the sample curve illustrates that the uncertainty of the QoS prediction is increasing with the time for which the prediction is valid. The bold dots mark the distinct predicted values. T1 denotes the time when the PIR requirement γmax for the V2V communication will be met. This time T1 corresponds to the minimum time for a planned maneuver; indeed, the target inter-vehicle distance (IVD) should not be reached before the communication requirements are met. Since FIG. 6 shows, that in the range from 0 to 20 s the QoS parameter γ is above 0.5 s the and γmax is around 0.4 s, it is evident that T1 is equal to approximately 20 s where the sample curve crosses the γmax value. Bearing these results in mind, the proposal now concerns an feasibility algorithm running in the calculation unit 40 which aims to match the chosen maneuver time TM1 with the fuel investment for the maneuver. This investment should be compensated with a high-density platooning (HDPL) time of TC1.

Figure 7:
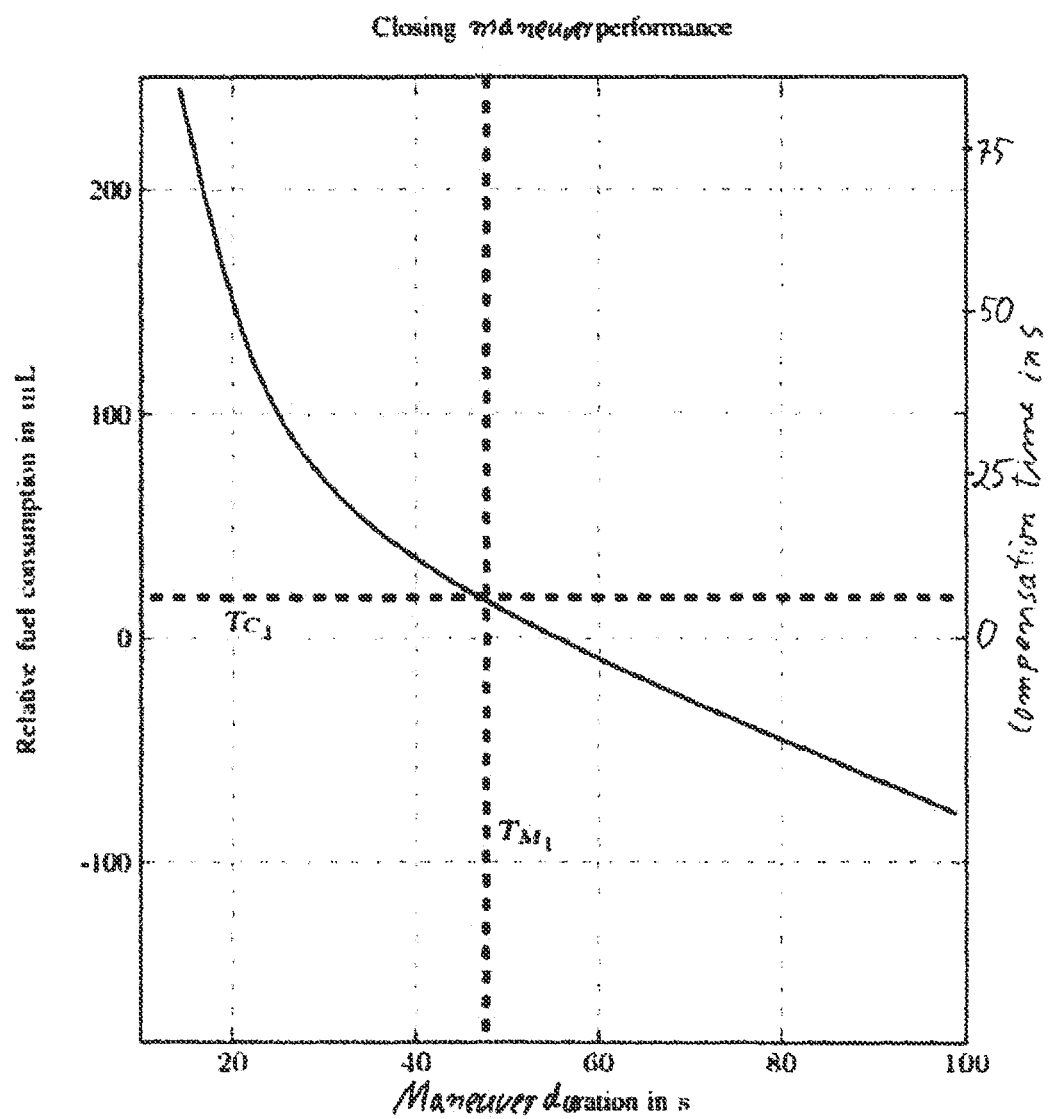
FIG. 7 shows the closing maneuver performance in terms of fuel consumption for the platoon of FIG. 5.

FIG. 7 shows a curve for the fuel investment in ml required for a closing maneuver performed during time TM1 and the corresponding compensation time TC1 in s. This curve is valid for a platoon of trucks with five platoon members.

Similarly, T2 is the end of the favorable QoS period where the sample curve crosses the γmax value again. However, this time T2 is affected by a large uncertainty, due to the inaccuracy of the longer term prediction of the PIR time. To deal with that, it is proposed to take the worst case calculation scenario into account and consider that there is a need to perform the fastest opening maneuver to deal with an unforeseen drop in the communication system performance. This is reflected by the times TM2, TC2 and ΔT2, the opening maneuvering time, its compensation time and the uncertainty on T2 respectively.

Figure 8:
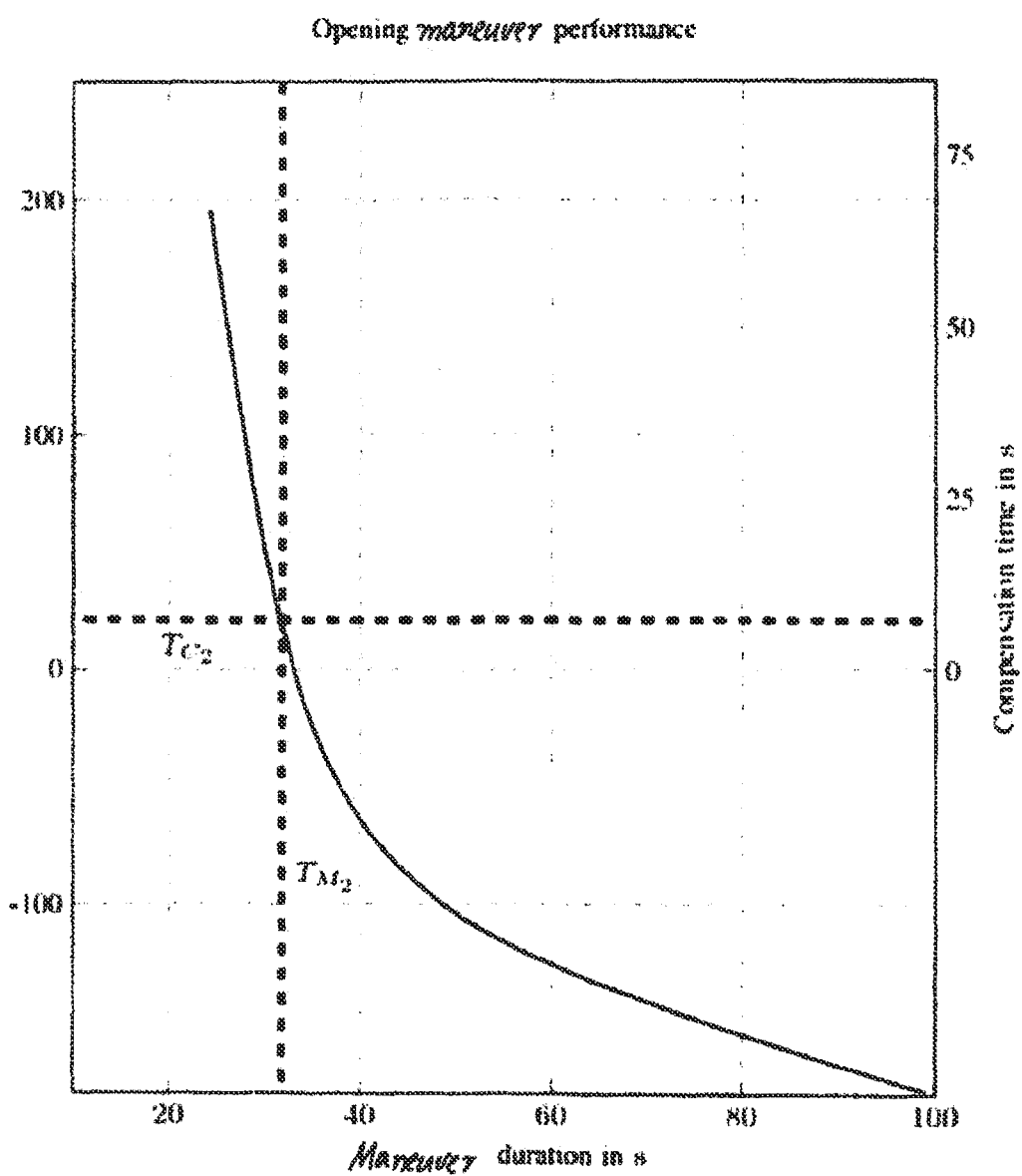
FIG. 8 shows the opening maneuver performance in terms of fuel consumption for the platoon of FIG. 5.

FIG. 8 shows a curve for the fuel investment in ml required for an opening maneuver performed during time TM2 and the corresponding compensation time TC2 in s.

FIG. 6 further shows the time TQ, which corresponds to a compensation time for the costs of HDPL technology deployment. This costs encompasses research, development and deployment investments, costs of the hardware or the QoS cost charged by the network operator.

The derivation is performed as following: T1 is provided by the communications system. TM1 is the chosen maneuvering time, with TM1≥T1. $T_{C1}$ is derived from TM1 and the corresponding fuel investment. TC2 is derived from the minimum maneuvering time TM2 and its related fuel investment.

Figure 9:
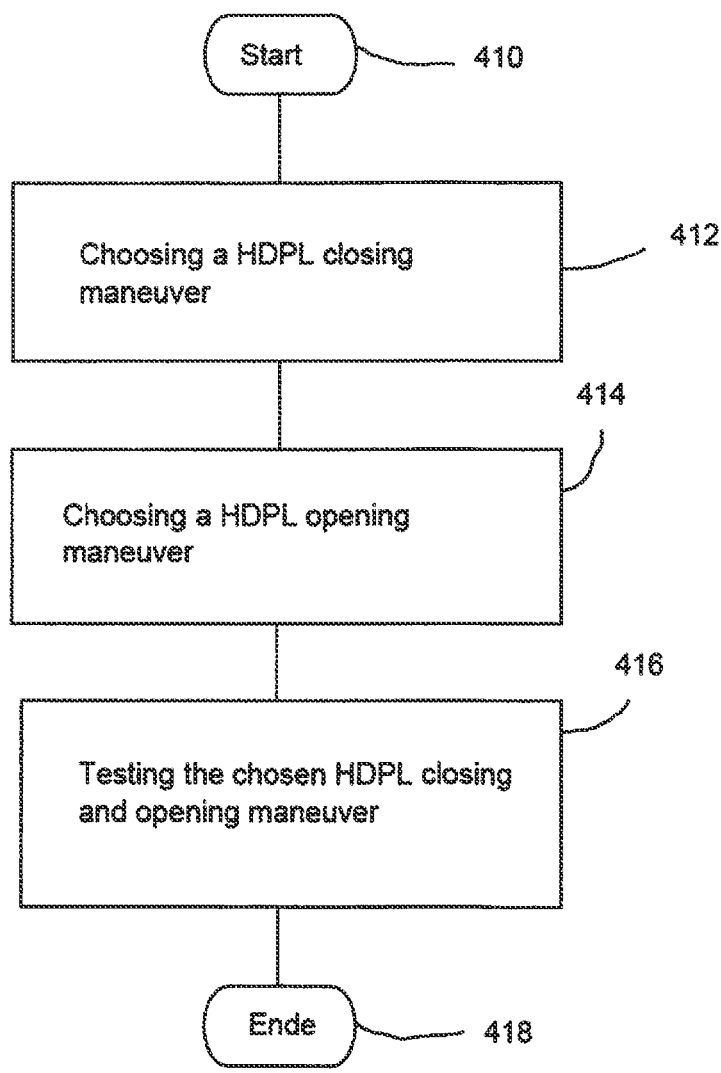
FIG. 9 shows a flow chart of a computer program which, when run in a computing device, performs a feasibility algorithm for testing different strategy choices.

FIG. 9 shows a flow chart for a computer program, which when run in the computing device 40 executes the feasibility algorithm. This algorithm has the purpose to test different choices for the opening and closing maneuvers in terms of economic and ecological success. In other words, it is checked if the maneuver strategy choice is beneficial in terms of energy consumption. In the feasibility algorithm the first operation at 412 is to choose the closing maneuver. Considering the growing uncertainty in terms of PQoS, the algorithm determines the smallest TM1+TC1 to have it done before the QoS becomes bad:

$$\min_{T_{M1}} T_{M1} + T_{C1} = T_{M1} + f_C(T_{M1}), \text{ with } T_{M1} \geq T_1,$$

where $f_c$ is the function yielding the compensation time $T_{C1}$.

The second operation at 414 is to obtain a short opening maneuver time TM2 that does not impact too much the overall balance with its compensation time TC2. This could be performed based on a similar formula:

$$\min_{T_{M2}} \alpha T_{M2} + \beta T_{C2} = \alpha T_{M2} + \beta f_C(T_{M2}),$$

where $f_c$ is the function yielding the compensation time $T_{C2}$. In this formula, α and β are weighting factors that make it possible to favor the short maneuvers whilst ensuring that the compensation time is also minimized. In other words, the minimization of $T_{M2}$ is more important than the minimization of $T_{C2}$, but $T_{C2}$ should not be too high because then it would lead to a systematic negative decision in the following testing operation. It is expressively notified that the introduction of the two weighting factors corresponds to an implementation of the Pareto efficient solution as claimed. The two weighting factors should be determined by making experiments during development of the HDPL application.

In the third operation at 146 the algorithm verifies the feasibility of the HDPL maneuver. This is performed with the following testing formula:

$$T_{M1} + T_{C1} + T_Q + T_{M2} + T_{C2} \leq T_2 - \Delta T_2,$$

If this condition is met for the determined values TM1, TC1, TM2, TC2 the feasibility of the HDPL cooperative driving maneuver is proofed.

Using the equations on the QoS profile provided by FIG. 6 in relationship with FIG. 7 and FIG. 8, the following values have been obtained with the feasibility algorithm: TM1=48.8 s and TC1=5.7 s. A fast opening maneuver, will be chosen considering the worst case QoS drop, yielding to TM2=31.7 s and TC2=6.8 s. It is seen in FIG. 8, that the cost of reducing the opening maneuver TM2 by 2 s would have a drastic compensation cost.

As a result, for the determined values a minimum prediction horizon of TQ+93 s is required, as seen when summing up the values for the left side of the testing formula. Of course, many more choices of closing and opening maneuvers may be tested, before one is found which fulfils the criterion in the testing formula. The typical cell diameter for an LTE mobile communication cell is about 5 km. To drive across such a cell with a velocity of 80 km/h lasts 3.75 min. Since at the end of the coverage area of a base station, the QoS is dropping, it is seen that the HDPL driving phase of 93 s is not unrealistic and could be extended in regions with good transmission conditions.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon how the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments, which are also considered to belong to the disclosure. It is possible that the communication prediction server is also located in the apparatus for performing the proposed method, which in a disclosed embodiment is located in the transportation vehicle.

REFERENCE SIGN LIST

10 Transportation Vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 Data Bus
110 Multifunction Display
120 Telephone
130 Navigation System
140 Radio
150 Camera
160 On-Board Communication Unit
172 Engine Control Device
174 Electronic Stability Control Device
176 Transmission Control Device
182 Distance Control Device
184 Drive Train Control Device
186 Lidar-Sensor
188 UWB Transceiver
190 On-Board Diagnosis Connector
200 Evolved Packet Core
210 Base Station
220 Communication Prediction Server
300 Internet
310 Road Side Unit
320 Backend Server
410-418 Various Method Operations of a Computer Program
PL Platoon Leader
PV1-PV4 Platoon Members
V1-V6 Further Transportation Vehicles
PC5 V2V Communication Link

The invention claimed is:

1. An apparatus comprising:
a processing device configured to determine a high-density platooning driving maneuver for subsequent coordination of a platoon of platoon members that are transportation vehicles, wherein the determination includes:
selection of a high-density platooning closing maneuver time period value during which an inter-vehicle distance between the platoon members is decreased;
selection of a high-density platooning opening maneuver time period value during which the inter-vehicle distance between the platoon members is increased; and
testing the selected high-density platooning closing and opening maneuvers time period values relative to at least one test criterion,
wherein the testing relative to the at least one test criterion includes a test of energy consumption while also considering a predicted quality of service profile of a vehicle-to-vehicle communication link for communication between the platoon members, wherein the predicted quality of service profile indicates a quality of service of the vehicle-to-vehicle communication link in the future for communicating between platoon members relative to a required end-to-end latency of the communication link that provides safe running and control and adapt inter-vehicle distance between the platoon members, and
wherein, in response to the selected high-density platooning closing and opening maneuvers not fulfilling the testing, the determination further includes waiting a time period and performing the selecting a high-density platooning closing maneuver time value and selecting a high-density platooning opening maneuver time period value again, and testing newly selected high-density platooning closing and opening maneuver time period values relative to the at least one test criterion.

2. The apparatus of claim 1, wherein at least a predicted quality of service profile for a packet inter-reception time of the vehicle-to-vehicle communication link is considered in the testing relative to the at least one test criterion.

3. The apparatus of claim 2, wherein at least one maximum value of the packet inter-reception time is selected for defining a limit of an acceptable quality of service level in the testing relative to the at least one test criterion.

4. The apparatus of claim 3, wherein a crossing time value at which the predicted quality of service profile crosses the selected at least one maximum value is used to test the selected high-density platooning closing and opening maneuver time period values.

5. The apparatus of claim 4, wherein the crossing time value is decreased by an uncertainty time value corresponding to an uncertainty for the quality of service prediction at the crossing time value.

6. The apparatus of claim 5, wherein the testing of the selected high-density platooning closing and opening maneuver time period values is made based on a comparison between:
   a sum of a closing maneuver time period value, its corresponding energy consumption compensation time value, a system deployment cost compensation time value, an opening maneuver time period value, and its corresponding energy consumption compensation time value, and
   an end of the predicted quality of service time value decreased by the uncertainty time value which reflects uncertainty of the quality of service prediction at the end of a favourable quality of service,
   wherein the end of the predicted quality of service time value is greater than or equal to the sum.

7. The apparatus of claim 1, wherein the high-density platooning closing maneuver time period value is selected by selecting the time period value from a predicted quality of service profile under the test criterion that the maximum useable value of the packet inter-reception time is reached at which the sum of the high-density platooning closing maneuver time period value and its energy consumption compensation time value are minimized, and at which the closing maneuver time period value is greater than or equal to the selected time period value.

8. The apparatus of claim 1, wherein a Pareto efficient solution is applied for selecting the high-density platooning opening maneuver time period value, in which minimization of an opening maneuver time period value is favored compared to minimization of the corresponding energy consumption compensation time period value.

9. A transportation vehicle comprising the apparatus of claim 1.

10. A method for determining a high-density platooning driving maneuver for subsequent coordination of a platoon of platoon members that are transportation vehicles, wherein the determination comprises:
    selecting a high-density platooning closing maneuver time period value during which an inter-vehicle distance between the platoon members is decreased;
    selecting a high-density platooning opening maneuver time period value during which the inter-vehicle distance between platoon members is increased; and
    testing the selected high-density platooning closing and opening maneuvers time period value s relative to at least one test criterion,
    wherein the testing relative to the at least one test criterion includes a test of energy consumption while also considering a predicted quality of service profile of a vehicle-to-vehicle communication link for communication between the platoon members, wherein the predicted quality of service profile indicates a quality of service of the vehicle-to-vehicle communication link in the future for communicating between platoon members relative to a required end-to-end latency of the communication link that provides safe running and control and adapt inter-vehicle distance between the platoon members, and
    wherein, in response to the selected high-density platooning closing and opening maneuvers not fulfilling the testing, the determination further includes waiting a time period and performing the selecting a high-density platooning closing maneuver time period value and selecting a high-density platooning opening maneuver time period value ue again, and testing newly selected high-density platooning closing and opening maneuver time period value s relative to the at least one test criterion.

11. The method of claim 10, wherein at least a predicted quality of service profile for a packet inter-reception time of the vehicle-to-vehicle communication link is considered in the testing relative to the at least one test criterion.

12. The method of claim 11, wherein at least one maximum value of the packet inter-reception time is selected for defining a limit of an acceptable quality of service level in the testing relative to the at least one test criterion.

13. The method of claim 12, wherein a crossing time value, at which the predicted quality of service profile crosses the selected at least one maximum value is used to test the selected high-density platooning closing and opening maneuver times.

14. The method of claim 13, wherein the crossing time value is decreased by an uncertainty time value corresponding to an uncertainty for the quality of service prediction at the crossing time value.

15. The method of claim 14, wherein the testing of the selected high-density platooning closing and opening maneuver time period values is made based on a comparison between
    a sum of a closing maneuver time period value, its corresponding energy consumption compensation time value, a system deployment cost compensation time value, an opening maneuver time period value, and its corresponding energy consumption compensation time value, and
    an end of the predicted quality of service time value decreased by the uncertainty time value which reflects uncertainty of the quality of service prediction at the end of a favourable quality of service,
    wherein the end of the predicted quality of service time value is greater than or equal to the sum.

16. The method of claim 15, wherein the high-density platooning closing maneuver time period value is selected by selecting the time value from a predicted quality of service profile under the test criterion that the maximum useable value of the packet inter-reception time is reached, at which the sum of the high-density platooning closing maneuver time period value and its energy consumption compensation time value are minimized, and at which the closing maneuver time period value is greater than or equal to the selected time period value.

17. The method of claim 15, wherein a Pareto efficient solution is applied for selecting the high-density platooning opening maneuver time, in which minimization of an opening maneuver time period value is favored compared to minimization of the corresponding energy consumption compensation time value.

18. A non-transitory computer readable medium including a computer program comprising program code for performing the method of claim 10 when the computer program is run on a processing device.

* * * * *